(12) United States Patent
Huitema et al.

(10) Patent No.: US 7,962,651 B2
(45) Date of Patent: Jun. 14, 2011

(54) PEER-TO-PEER NAME RESOLUTION PROTOCOL (PNRP) AND MULTILEVEL CACHE FOR USE THEREWITH

(75) Inventors: Christina Huitema, Clyde Hill, WA (US); John L. Miller, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1525 days.

(21) Appl. No.: 11/152,587

(22) Filed: Jun. 13, 2005

(65) Prior Publication Data

US 2005/0267992 A1    Dec. 1, 2005

Related U.S. Application Data

(62) Division of application No. 09/942,164, filed on Aug. 29, 2001, now Pat. No. 7,065,587.

(60) Provisional application No. 60/280,896, filed on Apr. 2, 2001.

(51) Int. Cl.
*G06F 15/16* (2006.01)

(52) U.S. Cl. ........................................ 709/245; 709/217

(58) Field of Classification Search .................. 709/217, 709/238, 243, 245
See application file for complete search history.

(56) References Cited

U.S. PATENT DOCUMENTS

| | | | |
|---|---|---|---|
| 5,025,491 A | 6/1991 | Tsuchiya | |
| 5,586,264 A | 12/1996 | Belknap | |
| 5,638,448 A | 6/1997 | Nguyen | |
| 5,689,679 A * | 11/1997 | Jouppi | ........................ 711/122 |
| 5,933,849 A | 8/1999 | Srbljic | |
| 5,987,376 A | 11/1999 | Olson | |
| 6,009,458 A | 12/1999 | Hawkins | |
| 6,081,845 A | 6/2000 | Kanemaki | |
| 6,134,327 A | 10/2000 | Van Oorschot | |
| 6,134,550 A | 10/2000 | Van Oorschot | |
| 6,144,959 A | 11/2000 | Anderson | |
| 6,205,481 B1 | 3/2001 | Heddaya | |

(Continued)

FOREIGN PATENT DOCUMENTS

JP    06046062    2/1994

(Continued)

OTHER PUBLICATIONS

European Search Report; EP 02 00 5770; Munich; Aug. 9, 2005.

(Continued)

*Primary Examiner* — Joseph E Avellino
*Assistant Examiner* — Marshall McLeod
(74) *Attorney, Agent, or Firm* — L. Alan Collins; Collins & Collins Incorporated

(57) ABSTRACT

A serverless name resolution protocol ensures convergence despite the size of the network, without requiring an ever-increasing cache and with a reasonable numbers of hops. This convergence is ensured through a multi-level cache and a proactive cache initialization strategy. The multi-level cache is built based on a circular number space. Each level contains information from different levels of slivers of the circular space. A mechanism is included to add a level to the multi-level cache when the node determines that the last level is full. A peer-to-peer name resolution protocol (PNRP) includes a mechanism to allow resolution of names which are mapped onto the circular number space through a hash function. Further, the PNRP may also operate with the domain name system by providing each node with an identification consisting of a domain name service (DNS) component and a unique number.

9 Claims, 7 Drawing Sheets

U.S. PATENT DOCUMENTS

| | | | |
|---|---|---|---|
| 6,269,099 | B1 | 7/2001 | Borella |
| 6,304,913 | B1 | 10/2001 | Rune |
| 6,304,974 | B1 | 10/2001 | Samar |
| 6,308,266 | B1 | 10/2001 | Freeman |
| 6,363,376 | B1 | 3/2002 | Wiens |
| 6,532,217 | B1 | 3/2003 | Alkhatib |
| 6,560,636 | B2 | 5/2003 | Cohen |
| 6,614,774 | B1 | 9/2003 | Wang |
| 6,615,347 | B1 | 9/2003 | De Silva |
| 6,636,854 | B2 | 10/2003 | Dutta |
| 6,654,796 | B1 | 11/2003 | Slater |
| 6,674,459 | B2 | 1/2004 | Ben-Shachar |
| 6,683,865 | B1 | 1/2004 | Garcia-Luna-Aceves |
| 6,748,420 | B1 | 6/2004 | Quatrano |
| 6,765,896 | B1 | 7/2004 | Ahmed |
| 6,898,200 | B1 | 5/2005 | Luciani |
| 7,051,102 | B2 | 5/2006 | Gupta |
| 7,065,587 | B2 | 6/2006 | Huitema |
| 7,177,950 | B2 | 2/2007 | Narayan |
| 7,185,194 | B2 | 2/2007 | Morikawa |
| 7,251,694 | B2 | 7/2007 | Gupta |
| 7,277,946 | B2 | 10/2007 | Humphrey |
| 7,350,074 | B2 | 3/2008 | Gupta |
| 7,383,433 | B2 | 6/2008 | Yeager |
| 7,418,479 | B2 | 8/2008 | Gupta |
| 7,493,363 | B2 | 2/2009 | Huitema |
| 7,533,184 | B2 | 5/2009 | Miller |
| 7,565,432 | B2 | 7/2009 | Huitema |
| 2001/0032258 | A1 | 10/2001 | Ishida |
| 2002/0073204 | A1 | 6/2002 | Dutta |
| 2002/0075900 | A1 | 6/2002 | Turina |
| 2002/0091833 | A1 | 7/2002 | Grimm |
| 2002/0116533 | A1 | 8/2002 | Holliman |
| 2002/0119821 | A1 | 8/2002 | Sen |
| 2002/0156875 | A1 | 10/2002 | Pabla |
| 2003/0023874 | A1 | 1/2003 | Prokupets |
| 2003/0041141 | A1 | 2/2003 | Abdelaziz |
| 2003/0055892 | A1 | 3/2003 | Huitema |
| 2003/0056093 | A1 | 3/2003 | Huitema |
| 2003/0056094 | A1 | 3/2003 | Huitema |
| 2003/0158839 | A1 | 8/2003 | Faybishenko |
| 2003/0177187 | A1 | 9/2003 | Levine |
| 2003/0188156 | A1 | 10/2003 | Yasala |
| 2003/0196060 | A1 | 10/2003 | Miller |
| 2003/0204566 | A1 | 10/2003 | Dhupelia |
| 2003/0204626 | A1 | 10/2003 | Wheeler |
| 2003/0204742 | A1 | 10/2003 | Gupta |
| 2003/0217105 | A1 | 11/2003 | Zircher |
| 2003/0217140 | A1 | 11/2003 | Burbeck |
| 2003/0236976 | A1 | 12/2003 | Wheeler |
| 2004/0054885 | A1 | 3/2004 | Bartram |
| 2004/0181487 | A1 | 9/2004 | Hanson |
| 2004/0213220 | A1 | 10/2004 | Davis |
| 2004/0236863 | A1 | 11/2004 | Shen |
| 2004/0264697 | A1 | 12/2004 | Gavrilescu |
| 2005/0044411 | A1 | 2/2005 | Somin |
| 2005/0216556 | A1 | 9/2005 | Manion |
| 2005/0267991 | A1 | 12/2005 | Huitema |
| 2006/0077911 | A1 | 4/2006 | Shaffer |
| 2006/0251085 | A1 | 11/2006 | Kalkunte |
| 2007/0288647 | A1 | 12/2007 | Humphrey |

FOREIGN PATENT DOCUMENTS

| | | |
|---|---|---|
| JP | 08263413 | 10/1996 |
| JP | 09266475 | 10/1997 |
| JP | 10243021 | 9/1998 |
| JP | 11004261 | 1/1999 |
| JP | 2000216827 | 8/2000 |
| JP | 2000287021 | 10/2000 |
| JP | 2001053806 | 2/2001 |
| JP | 2001526814 | 12/2001 |
| WO | WO 01/14990 | 3/2001 |
| WO | WO 93/24890 | 12/2001 |
| WO | WO 2004/062189 | 7/2004 |

OTHER PUBLICATIONS

Ion Stoica, Robert Morris, David Karger, M. Frans Kaashoek, and Hari Balakrishnan; A Scalable Peer-to-Peer Lookup Service for Internet Applications; MIT Technical Report; Mar. 23, 2001; http//www.lcs.mit.edu/publications/pubs/ps/MIT-LCS-TR-819.ps>.

Oram Andy (Ed); Peer-to-Peer: Harnessing the Benefits of a Disruptive Technology Passage; Peer-to-Peer: Harnessing the Benefits of a Disruptive Technology; Mar. 15, 2001; pp. 94-122.

Scholl: Napster Messages; Internet Citation; Apr. 7, 2000.

Sedgewick, R.; Algorithms in C—Third Edition—Part of Chapter XVI; Algorithms in C—Third Edition, 1998; pp. 662-691.

John Morris; Data Structures and Algorithms—Section 8.3; Online Publication 1998; http://ciips.ee.uwa.edu.au/{morris/Year2/PLDS210/hash_tables.html> : Aug. 8, 2005.

Sedgewick, R.; Algorithms in C—Third Edition—Chapter XIV; Algorithms in C++; 1998; pp. 573-608; Section 14.4.

Minami, et al., "The Design of Service Synthesizer on the Net", Technical Report of the Institute of Electronics, Information and Communication Engineers. SSE2000-236, IN2000-192(Mar. 2001), pp. 1-10. Accompanied with English Translation.

Prior Art Literature 1 (P2001-502494), pp. 1-32. Accompanied with English Translation.

Prior Art Literature 2, Kamimura, et al., "Gnutella, rediscovering the potential of the Internet" 2000-EIP-9, pp. 33-40. Accompanied with English Translation.

Prior Art Literature 4, P2001-526814. pp. 1-66. Accompanied with English Translation.

Dierks, "The TLS Protocol", Network Working Group Request for Comments: 2246, Jan. 1999.

Adam Langley, *The Freenet Protocol*, The Free Network Project, at http://freenet.sourceforge.net/index.php?page=protocol (last visited May 21, 2001).

Philip J. Erdelsky, *The Birthday Paradox*, EFG, at http://www.efgh.com/math/birthday.htm (last visited Mar. 8, 2002), Jul. 4, 2001.

*Red-Black Tree*, National Institute of Standards and Technology, at http://www.nist.gov/dads/HTML/redblack.html (last visited Mar. 5, 2002).

Lai, Kevin, and Mary Baker, *Measuring Link Bandwidths Using a Deterministic Model of Packet Delay*, at Department of Computer Science at Stanford University, 13 pages, 2000.

Rowstron, Antony, and Peter Druschel, *Pastry: Scalable, distributed object location and routing for large-scale peer-to-peer systems*, at Microsoft Research, Ltd., St. George House and Rice University, 20 pages, 2001.

Druschel, Peter, and Antony Rowstron, *PAST: A large-scale, persistent peer-to-peer storage utility*, at Rice University and Microsoft Research, 6 pages, 2001.

Rowstron, Antony, and Peter Druschel, *Storage management and caching in PAST, a large-scale, persistent peer-to-peer storage utility*, at Microsoft Research, Ltd., St. George House and Rice University, 14 pages, 2001.

Rowstron, Antony, Anne-Marie Kermarrec, Peter Druschel, and Miguel Castro, *SCRIBE: The design of a large-scale event notification infrastructure*, at Microsoft Research, Ltd., St. George House and Rice University, 20 pages, Nov. 7-9, 2001.

Dabek, Frank, Emma Brunskill, M. Frans Kaashoek, david Karger, Robert Morris, Ion Stoica, and hari Balakrishnan, *Building Peer-to-Peer Systems With Chord, a Distributed Lookup Service*, at MIT Laboratory for Computer Science, 6 pages, at http://pdos.lcs.mit.edu/chord 2001.

Ellison, C., *SPKI Requirements*, (The Internet Society 1999), at http://www.ietf.org/rfc/rfc2692, Sep. 1999.

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt, Jul. 26, 1999.

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693, Sep. 1999.

Sklower, "The PPP Multilink Protocol (MP)", Network Working Group Request for Comments: 1990, Aug. 1996.

Bit Torrent: "What is BitTorrent?" Copyright 2001-2005 BitTorrent, Inc.

Microsoft Corporation; "Introduction to Windows Peer-to-Peer Networking," Published: Jan. 2003.

Groove Networks, Customers: Case Studies; 2002-2005 Groove Networks, www.nps.navy.mil<http://www.nps.navy.mil>.

Heddaya, "WebWave: Globally Load Balanced Fully Distrubuuted Caching of Hot Published Documents", Technical Report: 1996-024, 1996. Boston University Boston, MA, USA, 9 pages.

Bolot, "Performance Engineering of the World Wide Web: Applicaiton to Dimensioning and Cache Design", Fifth WWW Conf. on Computer Networks and ISDN Systems 1996.

Partial Search Report, EP 02 00 5770, Munich, May 27, 2005.

* cited by examiner

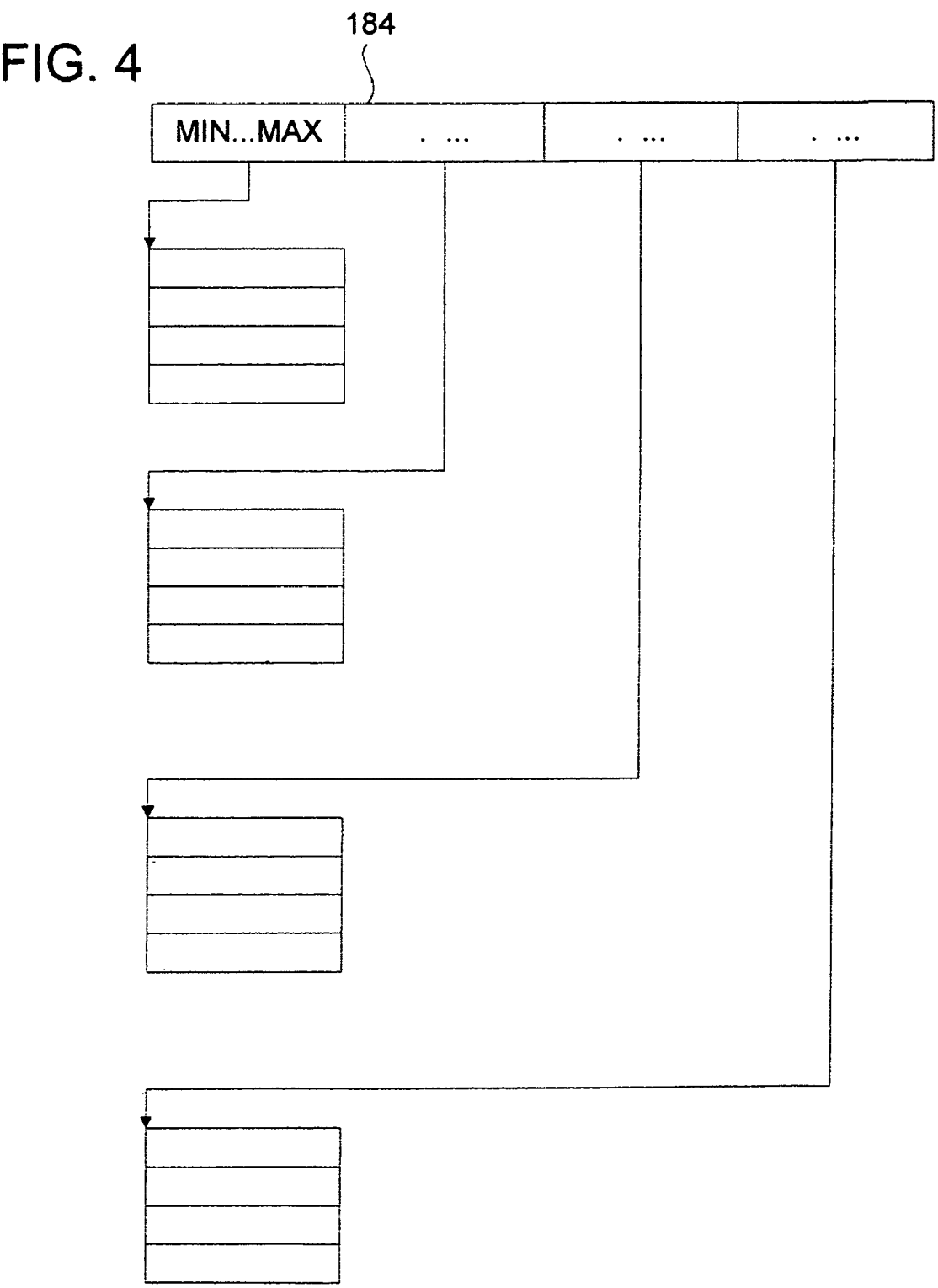

PEER-TO-PEER NAME RESOLUTION PROTOCOL (PNRP) AND MULTILEVEL CACHE FOR USE THEREWITH

CROSS-REFERENCE TO RELATED PATENT APPLICATIONS

This application is a divisional of U.S. patent application Ser. No. 09/942,164, filed Aug. 29, 2001, which claims the benefit of U.S. provisional patent application 60/280,896 filed Apr. 2, 2001; all of the aforementioned applications are hereby incorporated herein by reference.

FIELD OF THE INVENTION

The present invention relates generally to name resolution protocols, and more particularly relates to peer-to-peer name resolution protocols.

BACKGROUND OF THE INVENTION

Peer to peer communication, and in fact all types of communication, depend on the possibility to establish connections between selected entities. Entities may have one or several addresses. Indeed, these addresses often vary as the entities move in the network, because the topology changes, or because a lease cannot be renewed. A classic architectural solution to this addressing problem is thus to assign to each entity a stable name, and to "resolve" this name when a connection is needed. This name to address translation must be very robust, and it must also allow for easy and fast updates.

There are two classic types of name services, to wit, those based on the multicast, and those based on centralized servers. Recently, the pure peer-to-peer networks Gnutella and Freenet have tried to perform the naming function using distributed algorithms. Unfortunately, all of these algorithms have limitations, which limit their ability to provide a universal solution in networks approaching the size of the Internet.

In the multicast architecture, the requests are sent to a multicast address to which all the stations in the group listen. The target recognizes its name, and responds. Examples of such services are SLP and SSDP. Unfortunately, multicast services involve a high networking overhead, since the network must transmit many copies of any request. Additionally, they also involve a high computing overhead, since all the members of the group will receive and process all queries, only to discard those in which they don't recognize their own name. Because of these overheads, the multicast architecture is typically only used in very small networks that contain a limited number of nodes and a small number of links. In order to scale, the multicast protocols often include a provision for the insertion of centralized servers, and a transition to a centralized mode when a server is present.

In such a centralized architecture, the requests are processed by a centralized server whose database contains the mapping between names and addresses. The domain name service (DNS) used today in the Internet combines a centralized root with a network of servers, organized to solve hierarchical names. Unfortunately, centralized and semi-centralized services have proven to have several kinds of weaknesses. First, because all trust relies on the central server, updating information requires strong controls. In practice, centralized servers have difficulties coping with the load, and can only work if a large fraction of the queries are solved by means of caches. Old copies of the name to address resolutions linger in these caches, however, which makes fast updates difficult. Further, the centralized server is a point of political, legal and commercial control. These controls can interfere with the reliability of the service. One may be tempted to dismiss these weaknesses as mere scaling issues, but it is very clear that they derive directly from the use of centralized services.

In Gnutella, the database is fractioned into a large number of components. A global search is performed by executing parallel searches on a copy of each component and merging the results. This form of spreading trades memory, the footprint of the database on each node, for messages and computation. If the database is partitioned in P components, for example, then each request will request at least P messages and fill trigger searches in at least P nodes. If the dataset is limited in size, then the number of components P is entirely a function of the relation between the size of the dataset and the maximum size S that a given node can store. In that case, the system scales if the number P of components is basically a constant. However, as the number N of nodes increases, the number of copies of a given component grows as $O(N/P)$, which is equivalent to $O(N)$. As such, the number of searches grows as the number of nodes, $O(N)$. Therefore, the number of searches that a given copy of a component must process scales as the number of searches divided by the number of copies. As both numbers grow linearly with N, the number of searches per copy remains constant.

Unfortunately, in a name server application both the size of the database and the number of searches grow linearly with N, the number of members. This presents a scaling problem. Specifically, there will be $O(N/P)$ copies of any components, and $O(N)$ searches per unit of time. As such, each node will have to send $O(P)$ message per search. Since each component will be searched $O(N)$ time, each copy will be searched $(O(N)/O(N/P))=O(P)$ times. If there is a maximum size S for a given component, limited by the available memory, then P must grow as $O(N/S)$. If we assume that S is constant, then P must grow as $O(N)$. Thus, the number of searches that each node processes and the number of messages that each node sends and receives will both grow as $O(N)$. In short, if the dataset grows as the number of nodes, then a simple partitioning strategy cannot be sustained. In fact, a surge in demand during the NAPSTER trial caused the system to collapse. Later, the surge in demand caused the average traffic to exceed the capacity of modem links, which in turn caused the Gnutella system to splinter in a set of disconnected networks.

Freenet is a "peer to peer" network that organizes itself with an organic algorithm. The purpose of the network is to distribute documents, identified by a binary identifier. A search for a document will result in a request, propagated to a neighbor of the requesting node as illustrated in FIG. 8. If this neighbor does not have a copy of the document, it forwards the request to another neighbor, and so on. If the document is found, each node in the path, in turn, gets a copy, until finally a copy arrives at the initial requester. Also, there are cases in which no copy will be found, and the search will fail. Nodes that forward searches do not select a neighbor entirely at random. They compare the document's identifier to other identifiers that where previously served by the neighbors and stored in their routing table. Information stored includes a unique number, the address, and a certificate for these neighbors. The node then selects the "closest" neighbor which previously served documents whose identifiers were most similar to the searched identifier. According to the authors of this algorithm, nodes that receive successive requests for similar documents will accumulate a "cluster" of such documents. As such, the most popular documents will tend to be copied near the place where they are needed.

Freenet nodes maintain a "routing table" that associates document identifiers and the identification of neighbors from which a document was received. The routing tables are updated as a by-product of the retrieval process, i.e. when a request is successful, each node in the path enters in the table an entry linking the document identifier and the neighbor node from which the document was received. In a real life environment, there are limits to the practical size of the routing table. Once the limit is reached, nodes will have to select the entries that they intend to keep, or drop. When the limit is reached, a new input will replace the least recently used entry.

When a document is sought, the node looks up the nearest key in its routing table to the key requested and forwards the request to the corresponding node. In Freenet, the key is a 160-bit number. The routing table to find the best suited neighbor. If this neighbor is already listed in the path, the next one is selected, etc. If the search in the routing table is inconclusive, and if there are neighbors that were not already visited, one of these neighbors will be selected. If there is no available neighbor, the request is sent back to the previous node in the path, which can then try a better fit. If the request has rolled back all the way to the sender and there is no new neighbor, or if the maximum number of hops has been exceeded, a failure is declared.

The use of the Freenet algorithm to provide name service in networks containing, in first approximation, exactly one name per node in an environment in which each node publishes exactly one document illustrates the learning effect and its limitations. For example, the learning process is quite slow. Indeed, the learning effect varies widely based on several factors. First, the shape of the graph influences this process. A graph that is more connected yields better results. The number of hops allowed for a given request also plays a substantial role in the learning process. If that number is too small, the results are dramatically worse. The size of the cache in each node is a factor as is the size of the network.

The success rates achieved through the use of the Freenet algorithm vary for various network sizes, after allowing time for network learning. If the average number of neighbors per node is assumed to be 5, the requests are allowed to visit up to 256 nodes, and each node is able to cache up to 512 entries, the effect of the network size becomes quite dramatic. Past a certain size, the learning process stops working all together. On a 10,000 node network, for example, the success rate drops to about 40%. In short, the Freenet algorithm does not scale well.

There exists, therefore, a need in the art for a naming protocol, to the scale of the Internet, which can define the management of at least 10 billion name-to-address mappings. A preferred solution should be fully decentralized, self-tuning and efficient. It should also provide a high level of security. However, as the above discussion makes clear, none of the existing technologies provides such a protocol.

BRIEF SUMMARY OF THE INVENTION

The inventive concepts disclosed in this application involve a new name resolution protocol that can operate in the absence of any centralized server. This new peer-to-peer, serverless name resolution protocol ensures convergence despite the size of the network, without requiring an ever-increasing cache and with a reasonable numbers of hops.

As discussed above, pure peer-to-peer networks, such as Gnutella and Freenet, use distributed algorithms to perform the naming function. Unfortunately, these algorithms cannot guarantee convergence as the size of the network increases. That is, they cannot guarantee convergence without linearly increasing the size of the cache with the size of the network, and without extending the number of hops that are allowed to an unreasonable number.

The server-less or peer-to-peer name resolution protocol of the instant invention solves these problems and ensures convergence in large networks through two mechanisms: a multilevel cache and a proactive cache initialization strategy. The multilevel cache allows the protocol to adapt to networks of various sizes, and grows only as the logarithm of the size of the network (not linearly as required by prior peer-to-peer protocols). The multilevel cache is built based on an underlying concept of a circular number space. Each level in the cache contains information from different levels of slivers of the circular space. The number of levels in the cache is dependent on the size of the network to which it is attached. However, since this size is not known, a mechanism is included to add a level to the multilevel cache when the node determines that the last level is full. In this way, rapid convergence is assured.

As a first extension to the peer-to-peer name resolution protocol, a mechanism to allow resolution of names is also presented. These names are mapped onto the circular number space through a hash function. However, recognizing that there may be multiple entries for a single hash value (e.g. in large groups of 10,000 members), a unique number is associated with the hash of the name as <hash>.<unique number> (<M>.<N>). With this extension, the core protocol of the instant invention may be used for names as well as numbers.

The second extension to the base protocol of the present invention provides a real world integration of the peer-to-peer resolution protocol with the domain name system. By providing each node with an identification consisting of a DNS component and a unique number, the DNS mechanism can be used to locate the centralized server for that DNS component. That centralized server may then go into the peer-to-peer name resolution protocol (PNRP) space using the protocol of the present invention with the unique number portion to find the particular node, and return that information to the requester. The individual node can find a neighbor to help seed its cache by sending a request to the centralized server with a random number.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 4 is simplified illustration of the multilevel cache of the present invention;

Figure 1:
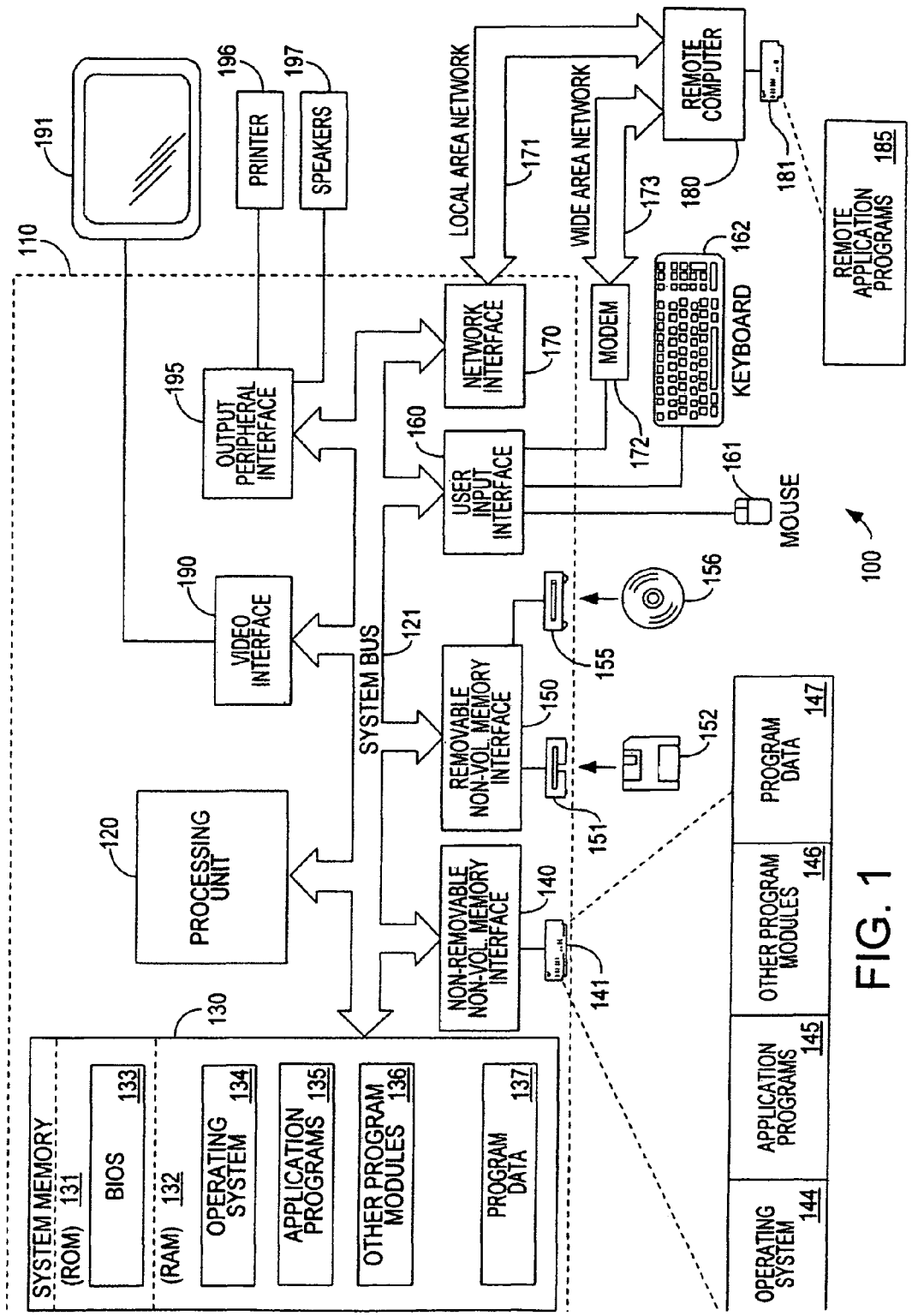
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As illustrated above, establishing peering relations is an expensive process in Freenet. This forces a relatively static graph, in which requests and files can only be forwarded along preexisting associations. However, the response rate improved when the number of associations per peer increased. This suggests that better results may be obtained if the peers where allowed to spontaneously build relations. Another observation is that an LRU management of the knowledge table may well be counterproductive. The clustering effect may occur, but it occurs in a haphazard way. Arrival of new information, through the results of queries, may in fact drown the useful knowledge in useless noise. In the system of the present invention, the knowledge management privileges the keys that are most similar to the keys of the local peer.

In an embodiment of the system of the present invention, each node accumulates a routing table that contains a list of references to other nodes in the network. For each node entry, a node identification and address, the key of the node, an identification of whether the node is a direct neighbor or not, and the distance between the key of this node and the key of the local node are obtained. Each time the local node learns about a remote node, it checks whether the node is already known, and if not whether to enter an entry in the routing table. This will always be the case as long as the number of entries has not reached the size limit. When the limit is reached the entry will only be added if it can replace the "less useful" entry, i.e. the current table entry whose key is the most distant from that of the local node. This way, the routing table will converge towards a list of the network nodes whose key is most similar to that of the local node. The replacement mechanism does not affect the direct neighbors. These neighbor entries are created when the graph is set up. This restriction is used in one embodiment in order to maintain some degree of connectivity.

In the system of the present invention, when a node receives a query it searches for the entry in its routing table whose key best matches the target, excluding the nodes that have already been visited. The query is then forwarded directly to the node that advertised the entry. If there is no adequate entry, the request is sent back to the sender, who will try another entry in its own routing table. The request is successful if it reaches the entry whose key matches the target. It is unsuccessful if the target is not reached in the maximum number of steps, or if the sender cannot find an adequate neighbor. In the case of successful requests, the response is relayed by all intermediate hops. It carries the address of the node that held the target key, and this entry can be inserted in the routing tables of the intermediate nodes.

In one embodiment the node identifiers are randomly selected integers, expressed in complement to 2 notation. With this notation, in an n-bit format, the numbers vary between $-2^{(n-1)}$ and $2^{(n-1)}-1$ The distance function calculates the absolute difference between two integers. This provides for a circular space in which the distance between the extreme points, $-2^{(n-1)}$ and $2^{(n-1)}-1$, is 1. An illustration of this circular number space 182 is provided in FIG. 2. In a network of N nodes, N randomly spaced identifiers in that circular number space are chosen. If a node accumulates a cache of K entries containing the identifiers of the K nodes whose identifiers are closest to its own identifier, that cache may be viewed as covering a sliver of the circular space whose average angular magnitude would be $\alpha=K/N$.

Figure 2:
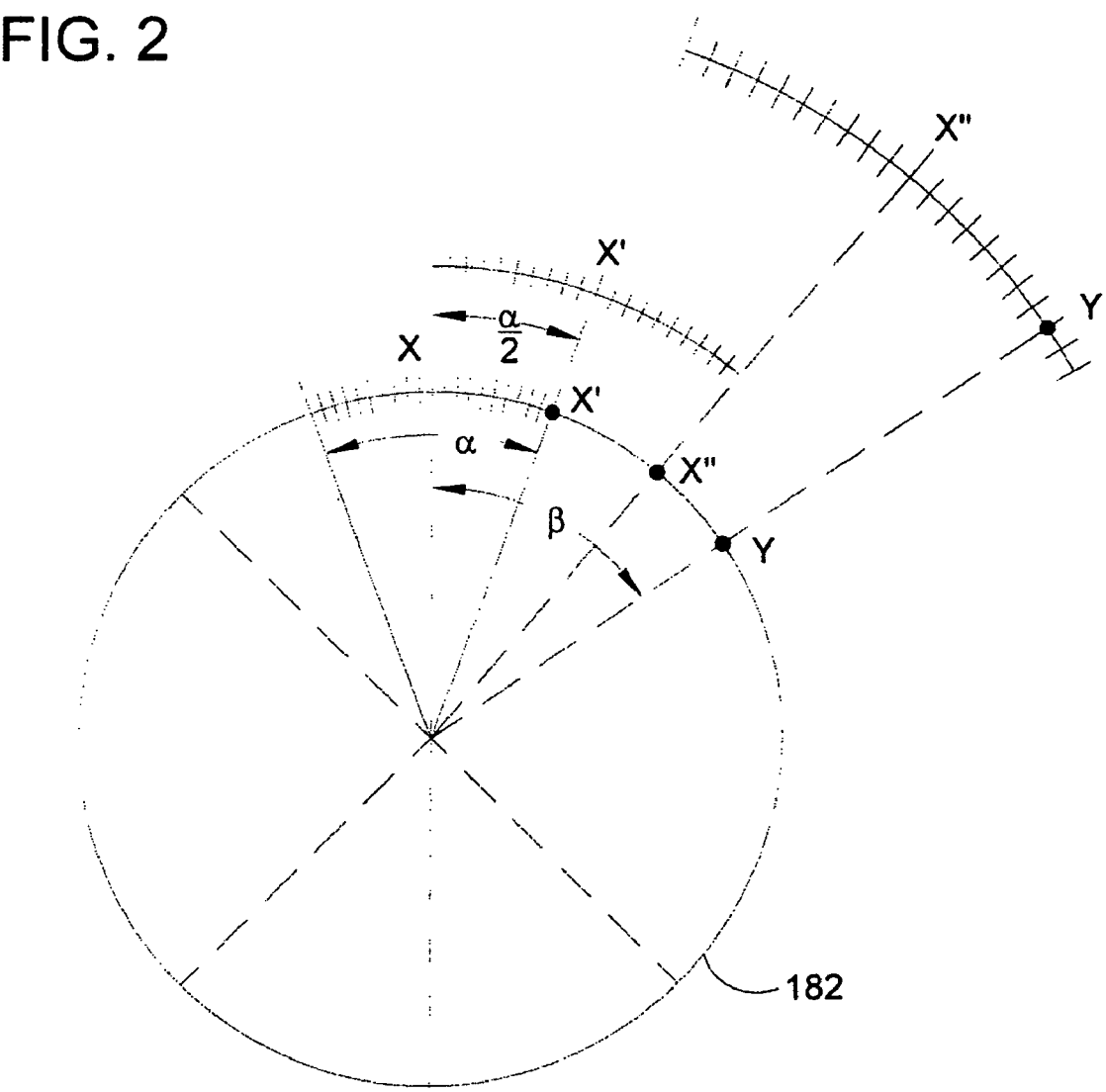
FIG. 2 is a graphical representation of the circular number space of the present invention.

When a node of identifier X receives a query for an identifier Y, the angular distance between X and Y may be expressed as $\beta=|X-Y|/2^n$. If $\beta$ is lower than $\alpha$, then Y should be one of the K entries in the local cache since the node will know of approximately all of the peers within this close sliver, as will be discussed below. The target has been found. In the other cases, the node will pick the entry that is closest to Y. That entry will be one of the edges of the sliver, which means that at the next step (hop), the angular distance will be reduced on average by $\alpha/2$. At this next hop (having an identifier of X', this process will be repeated, until the target is found. As illustrated in FIG. 2, an additional hop to a node having an identifier of X" is required to find the desired target Y. The maximum value of $\beta$ is $\pi$, corresponding to a distance of $2^{(n-1)}$, over which an average of N/2 entries will be found. Each step (hop) reduces the angle by $\alpha/2$, corresponding to K/2 entries. After a sufficient number of steps (hops), the request is assured to reach the target. Since $\alpha/2$ corresponds to K/2N, and since $\pi$ corresponds to N/2, the maximum number of steps is: $H=(N/2)/(K/2)=N/K$. Upon success, each node will acquire information about at least one node in successive slivers of the circular number space. This information is used to build a multilevel cache (described below) having a hierarchy of ever dense knowledge.

This illustrates one reason why the system of the present invention is successful. However, it also shows that, to maintain a small hop count, the size of the cache must grow linearly with the size of the network. This is not acceptable. In order to be practical, the system must scale better than linearly. A solution is to use the multilevel cache, i.e. split the routing cache in two parts, one containing the entries whose keys are nearest to the local key, another containing entries selected at random. As an illustration, suppose that the first cache contains K1 entries, and the second one K2. The first node that processes a request will select the entry whose key is closest to the target. If that entry is in the set K1 (corresponding to an angle of $\alpha$), the processing is complete. If it is in the set K2, the maximum distance between the target X and the selected entry Y will be at most half the distance between two entries in the set K2. If the entries were equally spaced, the distance would be $2^{(n-1)}/K2$, and the corresponding angle would be $\beta=\frac{1}{2}(K2)$. At the next node the query will be processed as discussed above. Each hop will see an angular reduction of at least $\alpha/2$, where $\alpha=K1/N$. The number of hops will thus be $H=1+2.\beta/\alpha=1+N/(K1.K2)$. For a given total number of entries to $K=K1+K2$, the smallest value of H is obtained when $K1=K2=K/2$. In this case, $H=1+N/(K/2)^2$.

The size of the identifiers may vary with the size of the network and need not be expressed in complement to 2 notation. However, a key requirement of the protocol is that node identifiers can be treated as integers, varying between a minimum value NMIN and a maximal value NMAX. In this space, DMAX may be defined as the maximum distance between two points, such that DMAX=(NMAX−NMIN)/2. As such, the distance D between two identifiers X and Y is defined as follows: (1) if X<Y, then swap X and Y; (2) if ((X−Y) <DMAX), then D=X−Y, else D=(NMAX+1−X)+(Y−NMIN). As indicated above, if numbers are stored in binary using complement to 2 logic, then the distance can be computed as the absolute value of the difference between X and Y.

When processing queries, the cache is used to find the most suitable next hop. This is done by first finding the subset of cache entries whose address is not already listed in the list of relays. If the subset is empty, an indication of failure is returned. However, if the subset contains exactly one entry, that entry is returned. Otherwise, two entries whose identifier is closest to the target of the request are found. These entries may be named A and B, and their respective distance to the target may be named DA and DB. The protocol of the present invention then picks at random between A (with weight DB) and B (with weight DA), and this random pick is returned.

In an alternate embodiment of the present invention, the cache may be divided into an arbitrary number of parts. For example, if we have P parts, we will have a first set containing K/P entries. The largest angle should be of the order of $\beta=P/2K$. The next hop will use the best match in the next level set, which will contain K/P entries, spread on an angle of size P/K. After that hop, the residual angle will be $b'=P^2/2K^2$. This will continue until the last set is reached, at which point the angle will be reduced, at each set, by $\alpha/2=K/(PN)$. The maximum number of hops will thus be $H=P-1+N/(K/P)^P$.

Figure 3:
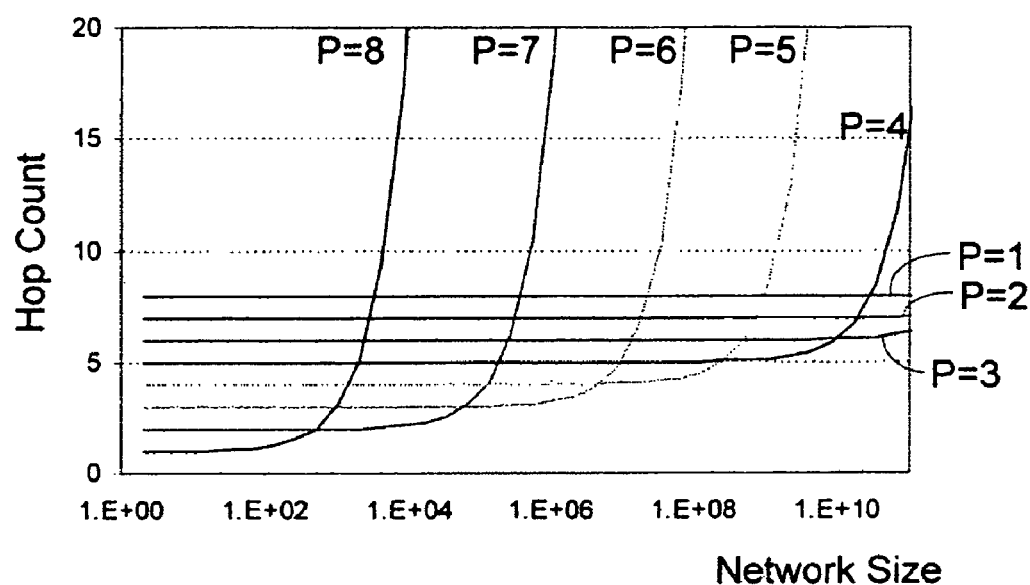
FIG. 3 is a graphical illustration of the average number of hops expected for convergence with the system of the present invention.

FIG. 3 shows the expected number of hops for a 500 entries cache and different values of P. The key point illustrated this figure is that it predicts that, even if the size of the network grew to $10^{10}$ entries, the requests would be solved in 6 hops or less, if the cache was partitioned in 5 or 6 data sets. For smaller networks, slightly better results may be achieved with a lesser number of partitions. In practice, the optimal number of partitions will vary with the size of the cache and the expected size of the network. In the above computations, it is assumed that, in each data set, the keys are regularly distributed along the number space. In networks where this is not necessarily true, the system can obtain the same efficiency by allowing twice the number of entries. In one embodiment the nodes only learn the address and identifiers of the nodes that were sending requests. In an alternate embodiment, the nodes that process each request also learn the address and identifier of the responder. In yet a further embodiment, in the case of failed requests, the nodes also learn the address and identifier of the stations whose identifier was closest to the target, even if the target was not present in the network.

This multilevel cache 184 may be visualized as illustrated in FIG. 4. As may be seen, each level of the cache includes an indication of the MIN and MAX identifier defining the bounds of that level. This MIN and MAX value is determined for the initial level as MIN=X−N/2 and MAX=X+N/2, where N is the size of the number space and X is the local ID. Within each level are the entries known by the node. Within successive levels, the MIN and MAX are defined as (L−1)/K, where L is the number of the level.

In an embodiment of the present invention, a proactive cache build up strategy is used, in which each node, when it connects to the network, sends a succession of gratuitous requests for strategically located identifiers. In simulations, 9 such requests have proven sufficient to populate the caches, so that all the queries sent during this simulation were served immediately, using in average 3 to 4 hops. However, more or fewer such requests may be utilized.

Figure 5:
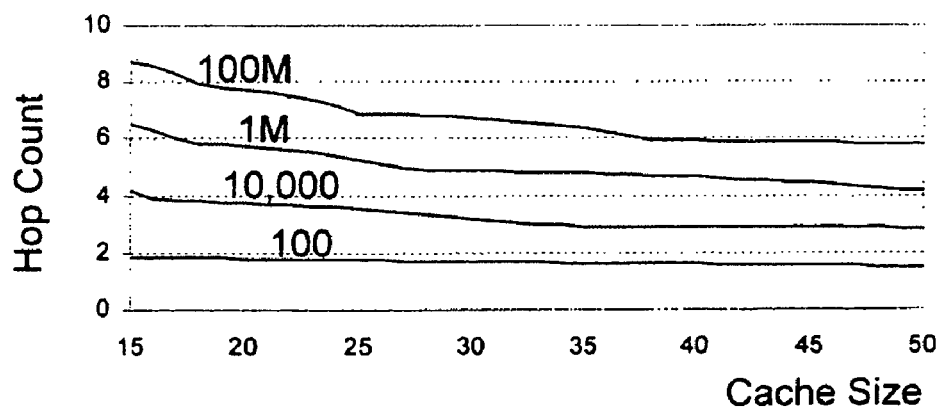
FIG. 5 is a graphical illustration of the number of hops versus cache partition size for several network sizes to reach convergence with the system of the present invention.

The multi-level cache is structured as a set of L levels, each holding at most K entries as illustrated in FIG. 4. The number of levels in the cache will be a function of the size of the network and of the number of entries in each partition. This is problematic since the nodes do not know a priori the size of the network to which they attach. For this reason, the nodes dynamically add a level to their cache if they find out that the "last level" is full. The number of entries in the last level of the cache is in fact a good prediction of the size of the network. This level is supposed to contain a complete sampling of the nodes whose identifiers fall in an interval of size $2*DMAX/(K^{(L-1)})$. If the number of levels in the cache is dynamic, then the only parameter that must be chosen is the number of entries per cache level. The choice of this parameter is a compromise between the efficiency of the query resolution procedure and the amount of ancillary traffic required to set up the cache content. FIG. 5 shows how the average number of hops required to solve a query varies as a function of the size of the cache. The computation assumes that the data are distributed randomly, and that the bounds of the cache for each level are computed as specified herein, i.e. dividing the covered size by K/2 at each level.

In one embodiment, the value of K is set to 20, although this value may be set to other values depending on network size, hop count limits, etc. Each level of the cache is characterized by a maximum distance to the local identifier. The distances are a function of DMAX, the maximum distance between two valid identifiers. DMAX is a function of the number space, of a coefficient P equal to N/2, and of the cache level. The last cache level contains entries whose distance to the local identifier is smaller than or equal to $DMAX/(P^{(L-1)})$. The first cache level contains entries whose distance to the local identifier is larger than DMAX/P The other cache level contains entries whose distance to the local identifier is larger than $DMAX/(P^L)$, where L is the value of the level.

When a node learns about a new entry, it tries to insert it in the cache. To do this, it performs the following steps. First, if the entry is already in the cache, the certificate of that entry is replaced by the newly learned value, if that value is most recent. Second, if the entry is not in the cache, the distance between the local identifier and the entry identifier is computed. This is used to determine the level at which the entry should be cached. If the selected level is the last level of the cache currently existing, and if there are more than K entries in the cache for that level, then a new level is added (set L=L+1). The entries at level L are then divided between these two levels according to their distance to the local ID. The selected level for the new entry is then reassessed. This process is repeated if necessary. If, however, there are less than K entries in the cache for the selected level, the new entry is simply added. If there are K entries in the cache for the selected level, a replacement algorithm is implemented to determine whether the new entry should replace an existing entry, and if so, which entry it should replace. The simplest replacement algorithm is a "random replacement", i.e. select at random one of the K cache entries and replace it by the newly learned value. Finally, if the new entry was added to the last level, a flooding algorithm discussed below is performed.

When a node adds an entry in the last level of its cache as just discussed, or if it replaces an existing entry with a more recent value, the node engages in a flooding procedure. To accomplish this procedure, the node prepares a flooding message containing the address certificate of the local node, with an empty list of already flooded nodes. This message is then sent to the address of the new entry. A list of the nodes in the cache whose distance to the new entry is smaller than $DMAX/(P^{(L-1)})$ is then prepared. If the addition of the new entry was a result of a flooding message, the nodes that are marked as already flooded are removed from the list. The node then prepares a flooding message containing the address certificate of the new entry. The list of already flooded nodes is set to contain the local node, all the nodes in the list, and, if the addition results from a flooding message, all the nodes marked as already flooded in that message. A copy of the message is then sent to all the nodes in the list. Nodes with limited capacity may opt to restrict the size of the list of "flooding targets." If they do so, they should retain in the list the nodes whose identifier is closest to the local identifier.

As indicated above, cache entries are represented by an address certificate that contains a date of validity. To maintain only current information about the other nodes in the network, and to reduce the clutter of obsolete data, cache entries are removed from the cache when the date of validity is passed in one embodiment of the present invention. Each node that participates in the network in this embodiment, therefore, regularly renews its address certificate. Upon renewal, the new value is flooded, as if the node had learned a new entry in the last level of its cache. This process ensures that its entry in the caches of other nodes will not be removed as obsolete.

At regular intervals, the nodes preferably examine the structure of their cache, and make sure that each cache level is reasonably complete. The last cache level is deemed to be always complete; any other cache level is not complete if the largest interval between two cache entries at this level is larger than $2*DMAX/(P^I)$, where I is the value of the level. If this is the case, the node will format a request message whose target is paced in the middle of the largest interval, and will engage in a standard processing of this request.

As illustrated above, the system of the present invention can handle networks of arbitrary sizes. However, each node must have a correctly initialized cache. As in Freenet, nodes learn about other nodes as a side effect of the regular processing of requests. Unfortunately, merely relying on the natural learning process is not sufficient to achieve reliable performance. Therefore, the system of the present invention complements the natural learning with three explicit procedures, the synchronization of direct neighbors, the flooding of the level 1 updates, and the forceful announcing of a node's presence. The neighbor synchronization procedure is designed to rapidly initialize the cache of a node that connects to the network. The procedure is also used when two nodes decide to make a formal connection. This is an easy way to cure a split. The flooding procedure ensures that the last level of the cache is consistent. This is necessary to guarantee that the searches will actually complete. Finally, the nodes announce their presence by looking for an identifier that is very close, but not equal, to their own identifier. The request is routed to an existing neighbor. By doing so, it is guaranteed that the host will be known by some related site This will also guarantee that the flooding procedure is triggered.

Before discussing the actual processing of these requests of the protocol of the present invention, it is instructive to discuss exemplary message and data formats appropriate in the protocol of the present invention. For example, each node in the network is described by an address certificate that contains a node identifier, the node address, a date until which the certificate is valid, and key and signature information. The format of the key and signature information will vary with the specific implementation. The important points are that the information is sufficient to prove that the node is a member of the peer-to-peer network, and that the relation between the node and the identifier is genuine. The date field is used to make sure that the information is up to date as discussed above with regard to the obsolescence of cache entries.

A request message contains the message code, REQUEST, the target of the request, the address certificate of the origin of the request, the maximum number of relays allowed for this message, and a progress list that contains for each node that processed the request: the address of the node; and an indication of whether the node accepted or refused the request. When the request is originated, the requesting node sets the message code, the target value, and the address certificate of the origin. The number of nodes is set to 1, and the progress list is initialized to contain exactly one entry with the address of the origin and an indication that the request was accepted.

A response message contains the message code, RESPONSE, the target of the request, the address certificate of the node that best matched the request, and a progress list that contains for each node that processed the request and has not yet processed the response the address of the node. Nodes get removed of the response list as the message makes its way towards the initial requester. A flooding message contains the message code, FLOODING, the address certificate that is being flooded, a list of all nodes that have already received a copy of the certificate, containing for each node the address of the node. Nodes get added to the list as the flooding progresses. A neighbor synchronization request contains the message code, SYNCHRONIZE, the target of the request, expressed as a node identifier, and the address certificate of the node that solicits the neighbor. A neighbor advertisement message contains the message code, ADVERTISE, the upper range of the advertisement, expressed as a node identifier, the address certificate of the node sending the advertisement, and a list of entries for which a certificate is available, containing for each entry the identifier of the entry. Finally, a neighbor synchronization request contains the message code, SOLICIT, the target of the solicitation, and the address certificate of the node that solicits the neighbor.

Having now described a set of messages applicable to the protocol of the present invention, attention is now turned to the resolution procedure introduced above. Specifically, the query resolution procedure is the process by which unique numbers get resolved to addresses. The node that requests a resolution formats a request message according to the specification discussed above, and forwards that message to the most adequate neighbor. The node that receive a request process it, and can either send back a response, forward the request to another node, or send back a refusal if it cannot process the request.

When a node receives a request message, it first checks that the certificate of the origin is valid. If the certificate is invalid, the request will be refused. If the certificate is valid, the node updates its cache information with the address certificate of the origin according to the rules specified above. It will then proceed with the message according to the following steps. First, the target of the request is compared to the local identifier. If the two values are identical, the final value has been found. The procedure then proceeds to step four, otherwise it continues to the second step. Second, the list of relays is checked to determine if it already contains an entry for the host. If this is true, the process proceeds to step four. Third, the number of nodes in the list of relays is checked to determine if it is lower than the number of allowed relays. If this is false, the process proceeds to step four. If this is true, however, an entry is added to the list containing the address of the node and an indication that the node accepted the query. Once this is complete, the process then proceeds to step four.

In step four, if the identifier matched the target, or if the number of relaying nodes has already reached the allowed number, the node updates the message code to RESPONSE and places its own address certificate as the certificate of the best matching node. The relay list of the response will only contain the relaying node that accepted the request. If the local node is the origin of the request, the processing is complete; otherwise, the message is relayed to the first entry that precedes the local node in the list of relays and whose code indicates that it accepted the request.

The node uses the cache information to try to find a suitable next hop whose address is not already listed in the list of relays. If there is a suitable next hop, the message is relayed to that host. However, if there is no suitable next hop, the entry corresponding to the relaying node is modified to indicate that the request was not accepted. If the node is the originator of the request, then the request has failed. Otherwise, the message is relayed to the first entry that precedes the local node in the list of relays and whose code indicates that it accepted the request. This procedure is designed to place all the transaction state inside the message. As such, intermediate nodes do not have to keep a list of ongoing transactions.

When a node receives a response message, it first checks that the certificate of the best match is valid. If the certificate is invalid, the request is refused. If the certificate is valid, the node updates its cache information with the address certificate of the best match according to the procedure discussed above. It then proceeds with the message according to the following steps. First, if the best match identifier is not equal to the target of the request, and if the local identifier is closer to the target than the best match identifier, the node replaces the best match certificate by the local certificate. Second, the node's entry is removed from the relay list. If the local node was the first entry in the relay list, the request is complete. Otherwise, the response is relayed to the last remaining node in the list. The intermediate relays do not need to keep state in order to execute correctly this protocol.

Figure 6:
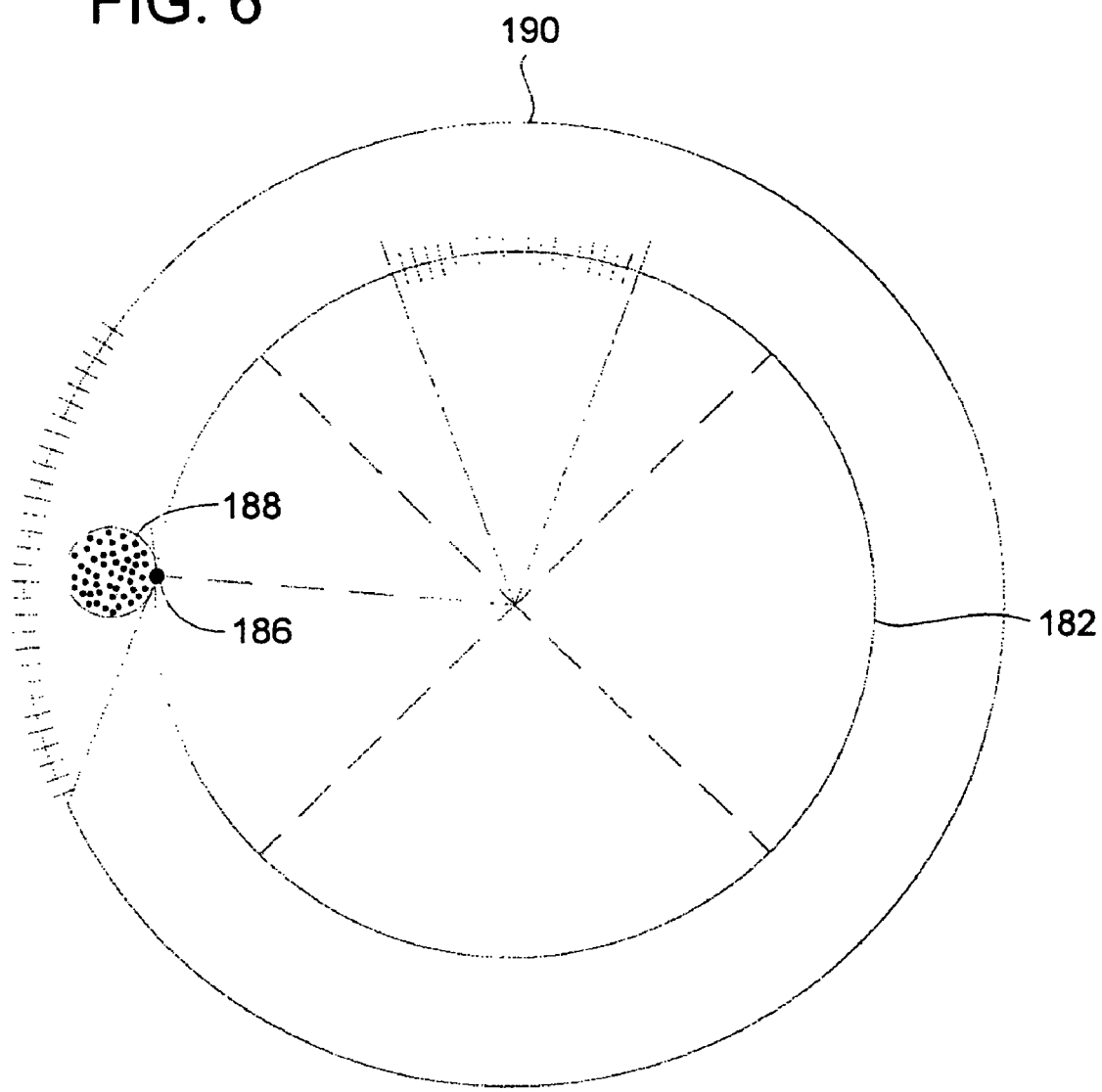
FIG. 6 is a graphical representation of the circular number space of the present invention as expanded to include name-to-number mappings in accordance with the present invention.

Having described the core Peer-to-Peer Name Resolution Protocol (PNRP) of the present invention, a mechanism to allow resolution of names through PNRP is now discussed. In summary, these names are mapped onto the circular number space discussed above through a hash function, e.g. MD5. However, there may be multiple entries for a single hash value (e.g. in large groups of 10,000 members). As such, the group will be located on the circular number space 182 as a single entry 186 as illustrated in FIG. 6, having a large group 188 associated therewith. If this were the only mechanism for the resolution of names to numbers, each node corresponding to that hash would have to have an enormous cache of all members within the group to satisfactorily resolve the search. To overcome this limitation, a unique number is associated with the hash of the name as <hash>.<unique number> (<M>.<N>). The practical result of this addition is to expand the circular number space 190 to include a mapping of each group member. With this extension, the core protocol discussed above may be used for names as well as numbers, and may scale to large groups.

This peer to peer name resolution protocol (PNRP) allows peers to resolve globally unique ID's into peer address certificates. A globally unique peer ID is preferably a 128-bit identifier. Ideally, peer IDs are randomly distributed in the peer ID number space. A peer address certificate (PAC) is a collection of data associated with a peer ID and contains the peer ID, peer instance address, peer friendly-name, full public key, and a signature which verifies integrity of the entire certificate, excluding the public key and derivations of the public key. Other data may be included in the PAC as needed. As discussed below, the system of the present invention utilizes peer IDs, and a category peer ID prefix useful for locating arbitrary instances of a class of peer resource.

Ideal properties for a peer ID scheme include random distribution; derivability, security enabler, and instantiability. By random distribution, it is preferred that instantiated peer IDs have a random distribution in the peer ID space discussed above. The less clustered the IDs, the better PNRP resolution works. By derivability, it is meant the ability to generate a peer ID from a common, unique friendly name. Derivability allows one to obtain a peer ID without knowing it in advance. This is advantageous because one can remember a more intuitive name such as an email address easier than a numeric peer ID. The security enabler refers to a peer ID composition that discourages identity theft. That is, in a preferred embodiment the system of the present invention identity ownership is verifiable. Finally, the PNRP of the present invention includes a well-defined mechanisms for allowing more than one active instance of a Peer ID, e.g., a user's peer ID active on two machines simultaneously.

A user-based peer ID composed in accordance with the present invention includes the following fields, from MSb to LSb:

| Offset | Bits | Field | Description |
| --- | --- | --- | --- |
| 0 | 64 | Name | Hashed extract of lower-case email address |
| 64 | 16 | Instance | Hashed extract of peer instance's address + port |
| 80 | 48 | KeySig | Hashed extract of the peers public key |

Since e-mail addresses must be globally unique addresses, an effective extract of the address allows for $2^{32}$ unique peers before a 50% probability of collision between extracts. The instance ID allows for $2^8$ instances before 50% probability of collision between instances. Preferably, the instance ID 0 is reserved for detection of collision, and is not a valid ID. Before registering itself with PNRP, a peer performs a search for its proposed peer ID (including the instance ID). If the ID is already in use, another ID is generated using a different instance hash. If, after three repetitions of this process all proposed peer ID's are in use, the peer is not allowed to register. This will minimize collisions. The KeySig is an extract of the peer's full public key. The extract is large enough (48 bits) to make generation of a new public key to match the extract very expensive. This allows the peer's key to be linked with a unique peer ID.

The three-field composition of a peer ID adequately meets the ideal properties of a peer ID. That is, they are randomly distributed, derivable and discoverable, secure, and instantiable. Because each of the fields is a hash with good distribution properties, peer ID's will be well distributed in the peer ID space. There will be some correlation between different instances of the same ID, but they are far enough apart in ID space to reduce impact on cache maintenance strategies discussed above. Additionally, the peer ID may be derived by its owner at any location, using a password that generates a local PAC, the local IP address, and a hash of their username. Further, the ID is discoverable to others. People seeking any instance of a person's peer ID may discover that ID—if present on the network—by deriving the first 64-bits of the peer ID from that person's email name, then searching for the peer ID with the $64^{th}$ bit set, and all remaining bits cleared. This guarantees that IDs which match the first 64 bits will be closer than any IDs which do not, making it likely an instance ID will be returned. Furthermore, retaining a person's full peer ID allows one to verify that anyone registering any instance of that peer ID knows the private secret associated with the ID. Identity theft is, therefore, very difficult if parties know any instance of your peer ID. Finally, up to $2^8$ instances of an ID may be present without significant inefficiencies in generating instance IDs.

Note that not all Peer ID's need to follow this composition in the system of the present invention. Insecure host peer IDs, for example, may not have an instance ID or public key ID, and instead may use the full 128 bits to identify the host. This usage must be reflected in the PAC, so that the ID does not fail verification. Additionally, peer ID composition allows for a small number of instances of the same identity. However, it is less useful for a large number of instances of the same identity. Category identifiers remove this limitation.

A category identifier is an optional 128-bit prefix to a peer ID. Peer IDs are valid entities without category identifiers. However, peer IDs may be paired with zero or more category IDs, generating 256-bit identifiers with the category ID in the most significant 128 bits. The most significant 128 bits of a 256-bit identifier is the category ID. The remainder identifies the category instance ID. Peers wishing to register category instances must register a category ID/peer ID pair. The peer ID should be the registering resource's peer ID, and the associated certificate must contain both the category ID and peer ID. It must be signed with the peer ID public key (if any). This prevents secure peers from being registered as service providers against their will.

As an example of the above, suppose a user having an e-mail address of exampleuser@microsoft.com is in an Internet café and wants to generate a local PAC. He logs into the local peer services, provides his unique e-mail address, and types in his password. The password, seeded by his email address, generates a private and public key. Peer services obtains the local IP address and generates a proposed instance ID. PNRP does a quick search to make sure the peer ID isn't already in use, then creates a full PAC and registers exampleuser@microsoft.com's ID. This ID is exactly the same as his ID in other locations, with the exception of the instance ID.

As a further example, suppose a secure peer machine MyQuakeBox.nwlink.com is hosting a Quake III server and wants to make it available worldwide, even when the global Quake III referral server is unreachable. Quake aficionados have agreed to register their servers with peer services, using three identifiers with varying degrees of detail. MyQuakeBox.nwlink.com generates three category ID's: "quake iii", "quake iii v.10a", and "quake iii v. 10a, Seattle wa usa". It generates three new PAC's, one for each category, and signs each with its local key to prove it generated the advertisement. MyQuakeBox registers the three Category/Peer ID pairings with local PNRP services, and people may start discovering and playing on the server immediately.

As a still further example, suppose a user named Herman has written a self-help book on how to play less computer games, and wants to make it available over the peer network. He is constantly modifying it, and wants people to always be able to get the most recent copy. Herman's machine is GamePlayer.domain.com. Herman creates a resource peer ID and a peer resource certificate (PRC), pairing a particular resource (in this case his book) with GamePlayer's peer ID. The PRC is signed both by the resource peer ID, and by GamePlayer. Herman registers the book using several categories, including "book: selfhelp", "selfhelp", "how to play less computer games", "herman mustplay", the book's ISBN number, and its Dewey decimal number. Anyone searching for any of these categories may find Herman's book. For the most specific categories (his name, the book title, ISBN number), a search will retrieve ONLY the PRC for his book.

With this extension to the core PNRP of the present invention, an individual host's cache management may become more complicated. That is, if more than one ID is stored on a given host, cache management must ensure that good neighborhoods are maintained for each represented ID. In the ideal case (ignoring memory and processing), this cache contains unique levels for each ID up to the point where two ID's overlapped at the same cache level, then shared upper level caches. A cached PAC could have logical membership in more than one cache level between different represented ID's.

The second extension to the base protocol of the present invention provides a real world integration of the peer-to-peer resolution protocol with the domain name system (DNS). By providing each node with an identification consisting of a DNS component and a unique number, the DNS mechanism can be used to locate the centralized server for that DNS component. That centralized server may then go into the peer-to-peer name resolution protocol (PNRP) space using the protocol of the present invention with the unique number portion to find the particular node, and return that information to the requester. The individual node can find a neighbor to help seed its cache by sending a request to the centralized server with a random number.

Specifically, the PNRP DNS linkage allows for the resolution of peer identifiers (PrID's) into authoritative address certificates. This service allows subscribers to obtain the correct address for a connected peer. The internet uses DNS for address resolution. It is advantageous to link DNS to PNRP for name resolution. Such linkage should enable DNS clients to obtain the IP address of a PNRP client, using that client's friendly-name or encoded PrID. It also minimizes the risk of a DNS resolver caching an expired address. Further, it is lightweight enough to run on any PNRP subscriber.

The PNRP DNS gateway will listen for TCP and UDP connections on port 53. It will only accept queries with QCLASS=IN, and QTYPE=A or *. Make that type=AAAA or A6 (IPv6 addresses). The gateway will divide the QNAME into a hostname and a domain suffix. The domain suffix must either be absent, or have 'P2P.' as its leftmost component. Any other domain suffix will result in 0 answers. Preferably, the suffix is made part parametrizable, a definition of the naming cloud.

When the gateway receives a valid query, it will perform up to two PNRP searches on the hostname. First, a search will always be performed upon the results of the default friendly-name-to-PrID conversion. Preferably, this conversion is a 32-bit CRC of the friendly-name. Second, if the hostname corresponds to a valid ASCII representation of a hexadecimal PrID, the hostname will be converted to a binary PrID, and a search for that PrID initiated. Recognizing a need for stronger security, a combination of a strong hash and secret may be used. If either search returns an address certificate which exactly matches the query, a DNS A-record is constructed for the match. The A-record TTL is set to either 10 minutes or the TTL of the address certificate, whichever is shorter. The response is marked as authoritative.

A DNS server may be linked to a PNRP DNS gateway one of two ways. First, a new zone may be created which is a child of the DNS server's authoritative zone. For example, NTDEV.MICROSOFT.COM.'s authoritative name server would have a zone P2P.NTDEV.MICROSOFT.COM with one or more NS records pointing to local PNRP DNS gateways. Second, a new zone P2P may be created. If such a zone is present in each domain, pointing to the closest PNRP DNS gateway, peers may use DNS to discover their local PNRP access point by resolving <PrID>.P2P. Ideally, each DNS server would have both zones defined, to allow both local and global access to local P2P networks.

Figure 7:
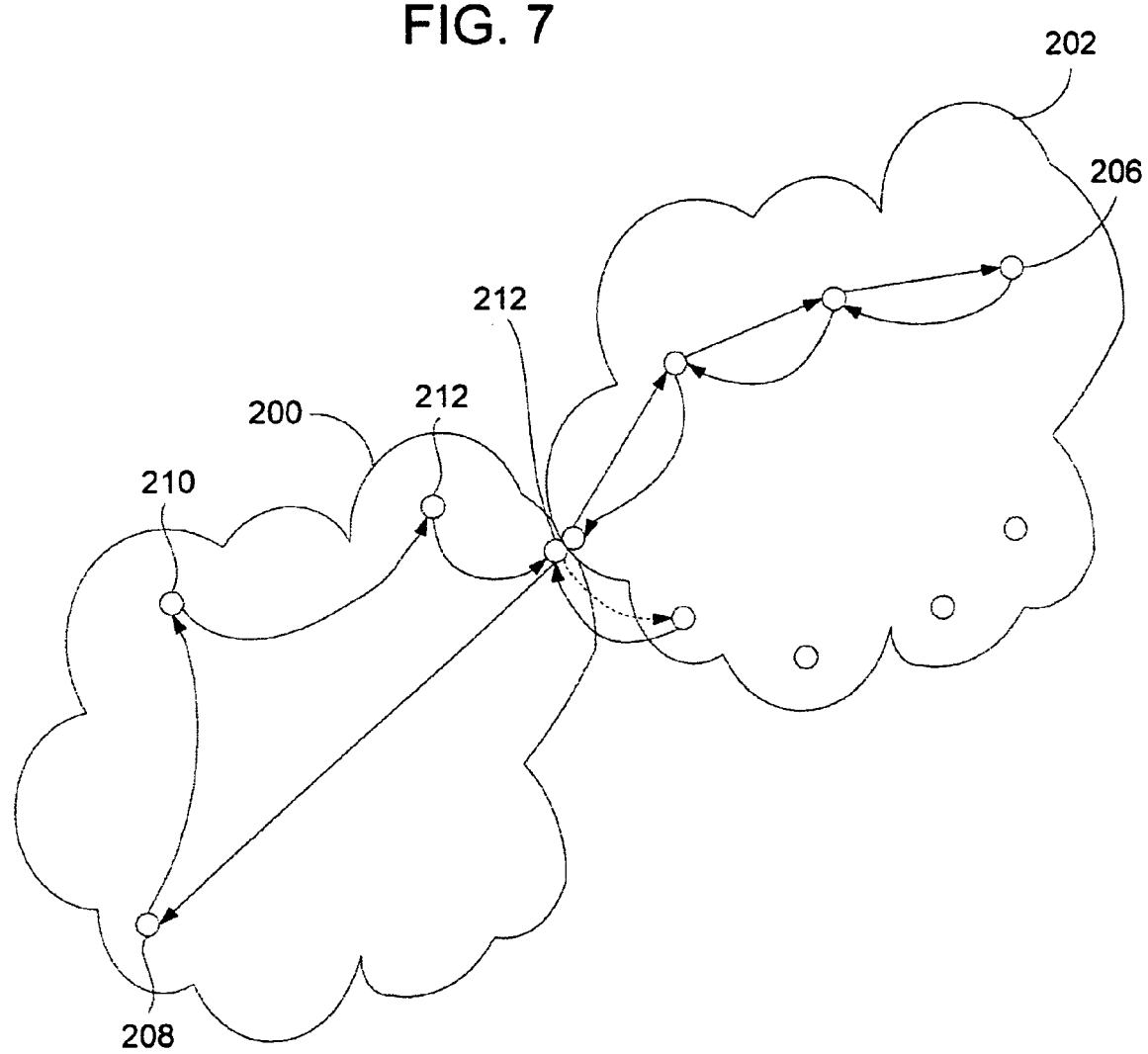
FIG. 7 is a simplified graphical illustration of the domain name service (DNS) and peer to peer space illustrating crossover application of the system of the present invention between these two spaces.
Figure 8:
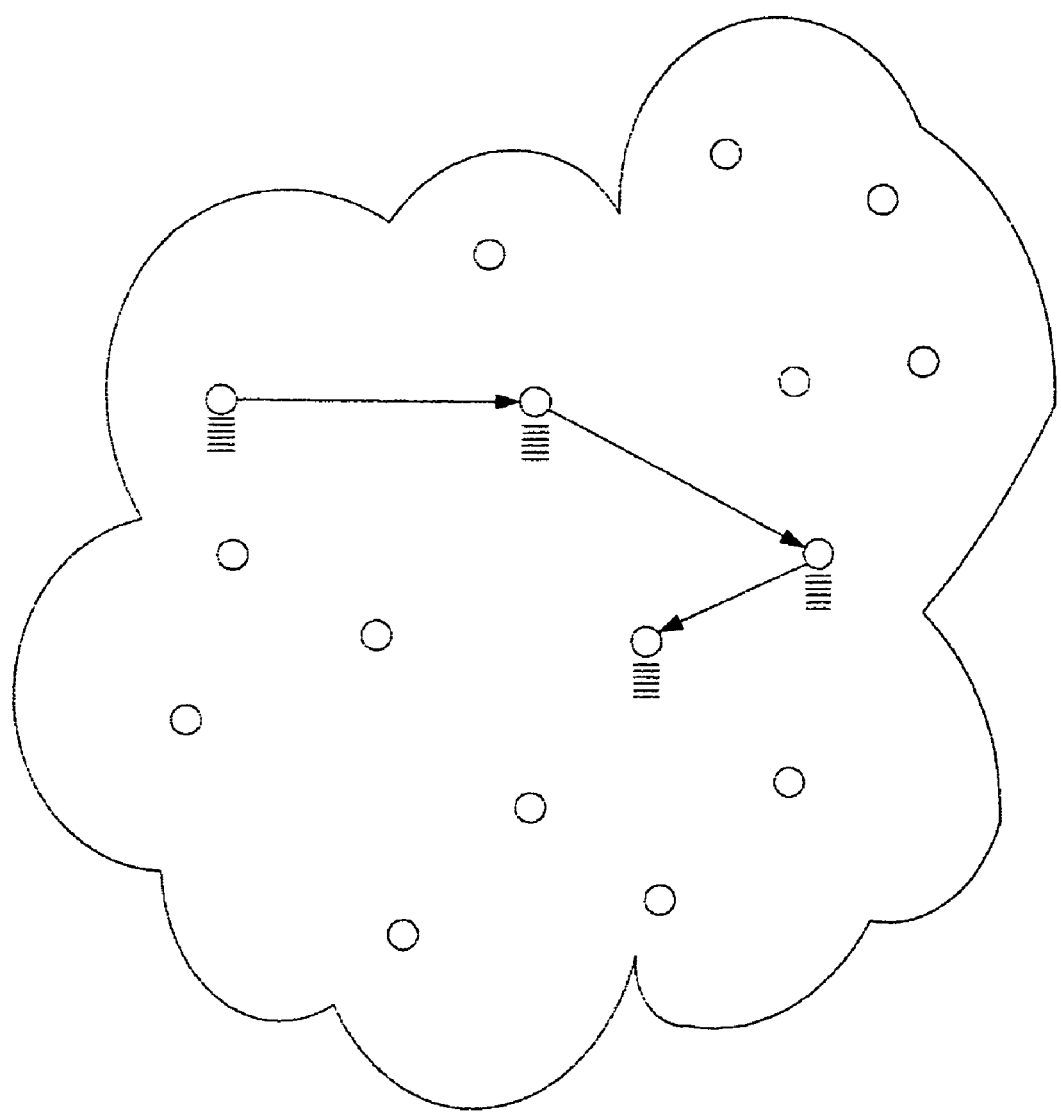
FIG. 8 is a graphical illustration of a peer-to-peer space.

An example of this extension of the PNRP of the present invention to DNS is illustrated in FIG. 7. This figure illustrates the two spaces, the DNS space 200 and the peer to peer space 202. The linkage between these two spaces is provided by a server 204 having an exemplary name of ptp. microsoft.com. A node 206 existing in the peer to peer space 202 may have an exemplary name of 123450AF39.ptp.microsoft.com. Alternatively, the unique number ID may be replaced with a friendly name as discussed above with regard to the name to number extension to the core protocol. When a node 208 in the DNS space 200 wishes to find the node 206 in the peer to peer space 202, it 208 sends a DNS query to the .com root server 210, which passes the query to the microsoft server 212, which passes the query to the .ptp server 204. This server then uses the node id and the protocol of the present invention to find the target node 206 in the peer to peer space 202 as discussed above. When the target node 206 is found, the address is returned to the requesting node 208 in the DNS space. When a new node [[214]] wishes to plug into the system and seed its cache, it simply sends a request for a node having an id in the form of <random number>.ptp.microsoft.com.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A multilevel cache of a computing device for use in a peer to peer name resolution protocol, the multilevel cache comprising a set of L levels, each level sized to hold K entries, and the computing device configured to, in response to an attempt to add a K+1 entry to the multilevel cache's $L^{th}$ level that is occupied by K entries, add a $L+1^{th}$ level to the multilevel cache and divide the K entries between the $L^{th}$ level and the $L+1^{th}$ level and replace a randomly selected entry in the multilevel cache's $L^{th}$ level with the K+1 entry.

2. A method of dynamically maintaining a multilevel cache for use in a peer to peer name resolution protocol, comprising the steps of:
  receiving a new entry to be entered into the multilevel cache of a computing device;
  determining in which level the new entry is to be stored;
  determining if the level into which the new entry is to be stored is full;
  storing the new entry in the level when the level is not full;
  randomly replacing another entry with the new entry when the level is full and when the level is not a last level of the multilevel cache; and
  adding a new level when the level is full and when the level is the last level of the multilevel cache, sorting entries from the last level between the last level and the new level, and storing the new entry, the method performed by the computing device.

3. The method of claim 2, wherein the step of determining in which level the entry is to be stored comprises the step of determining if the entry already exists in the multilevel cache, and replacing an address certificate for the entry when the address certificate is more recent than the address certificate of the entry stored in the multilevel cache.

4. The method of claim 2, wherein the step of determining in which level the new entry is to be stored comprises the step of computing a distance between a local identifier and an entry identifier.

5. A computer-readable storage media excluding signals and carrier waves comprising computer-executable instructions that, when executed by a computing device, cause the computing device to perform a method comprising:
- receiving a new entry;
- determining a level of a cache in which to add the new entry, wherein the cache comprises L levels with each level configured to hold K entries; determining that the level is occupied by K entries;
- selecting, in response to the determining that the level is occupied by K entries, a random entry in the level of the cache; and
- replacing the selected entry with the new entry.

6. The computer-readable storage media excluding signals and carrier waves of claim 5, further comprising:
- preparing a message comprising an address certificate; and
- sending the message to an address associated with the new entry.

7. The computer-readable storage media excluding signals and carrier waves of claim 5, further comprising:
- determining that the level is the $L^{th}$ level of the multilevel cache; and
- adding, in response to the determining that the level is the $L^{th}$ level of the multilevel cache, a $L+1^{th}$ level to the multilevel cache.

8. The computer-readable storage media excluding signals and carrier waves of claim 7, further comprising:
- dividing the K entries between the $L^{th}$ level and the $L+1^{th}$ level.

9. The computer-readable storage media excluding signals and carrier waves of claim 8, wherein the dividing is based on a distance between a local identifier and an identifier of one of the K entries.

* * * * *

UNITED STATES PATENT AND TRADEMARK OFFICE
CERTIFICATE OF CORRECTION

PATENT NO. : 7,962,651 B2
APPLICATION NO. : 11/152587
DATED : June 14, 2011
INVENTOR(S) : Christian Huitema et al.

It is certified that error appears in the above-identified patent and that said Letters Patent is hereby corrected as shown below:

In Face page, in field (75), under "Inventors" column 1, line 1, delete "Christina" and insert
-- Christian --, therefor.

In Face page, in field (60), under "Related U.S. Application Data" after "2001" insert -- , Now ABN --.

In column 1, line 11, after "2001" insert -- , Now ABN --.

Signed and Sealed this
Thirtieth Day of August, 2011

David J. Kappos
*Director of the United States Patent and Trademark Office*